United States Patent
Kashioka et al.

(10) Patent No.: US 6,643,401 B1
(45) Date of Patent: Nov. 4, 2003

(54) APPARATUS AND METHOD FOR RECOGNIZING CHARACTER

(75) Inventors: Junji Kashioka, Kanagawa (JP); Satoshi Naoi, Kanagawa (JP)

(73) Assignee: Fujitsu Limited, Kawasaki (JP)

(*) Notice: Subject to any disclaimer, the term of this patent is extended or adjusted under 35 U.S.C. 154(b) by 0 days.

(21) Appl. No.: 09/339,200

(22) Filed: Jun. 24, 1999

(30) Foreign Application Priority Data

Dec. 16, 1998 (JP) .......................................... 10-357701

(51) Int. Cl.$^7$ ................................................ G06K 9/48
(52) U.S. Cl. ...................... 382/197; 382/179; 382/181; 382/185; 382/190; 382/229
(58) Field of Search ................................ 382/100, 101, 382/102, 159, 170, 176, 177, 178, 179, 181, 182, 185, 186, 187, 190–193, 195, 197, 198, 202, 209, 218, 224, 229, 294, 305; 209/584, 900; 345/191; 707/6, 7; 715/541

(56) References Cited

U.S. PATENT DOCUMENTS

| | | | |
|---|---|---|---|
| 4,259,661 A | * 3/1981 | Todd | 328/205 |
| 4,516,262 A | * 5/1985 | Sakurai | 382/185 |
| 4,700,400 A | * 10/1987 | Ross | 382/205 |
| 4,910,787 A | * 3/1990 | Umeda et al. | 382/194 |
| 4,998,626 A | * 3/1991 | Ota | 382/102 |
| 5,025,475 A | * 6/1991 | Okabe | 382/101 |
| 5,521,985 A | * 5/1996 | Camp, Jr. et al. | 382/176 |
| 5,535,287 A | * 7/1996 | Niki | 382/178 |
| 5,561,720 A | * 10/1996 | Lellmann et al. | 382/178 |
| 5,581,633 A | * 12/1996 | Hotta et al. | 382/171 |
| 5,872,864 A | * 2/1999 | Imade et al. | 382/176 |

FOREIGN PATENT DOCUMENTS

| | | | |
|---|---|---|---|
| JP | 60-118985 | 6/1985 | |
| JP | 63-79193 | 4/1988 | |
| JP | 63-298494 | * 6/1988 | ............ G06K/9/62 |
| JP | 10-154204 | 6/1998 | |
| JP | 10-162102 | 6/1998 | |
| JP | 10-162103 | 6/1998 | |

OTHER PUBLICATIONS

Kuhnke, et al "A system for machine–written and hand–written character distinction", IEEE, pp. 811–814, 1995.*

Violante, et al discloses "A Computationally Efficient Technique for Discriminating between Hand–written and Printed Text", IEEE, 1995.*

* cited by examiner

*Primary Examiner*—Daniel G. Mariam
(74) *Attorney, Agent, or Firm*—Staas & Halsey LLP

(57) ABSTRACT

A character pattern is extracted from image data read from a document, listing, etc., and discriminated between a handwritten character and a typed character by a hand-written/typed character discrimination unit. The hand-written/typed character discrimination unit obtains, from the character pattern, N feature vectors containing a feature indicating at least the complexity and the linearity of the character pattern; and discriminating the character pattern between a hand-written character and a typed character using the feature vectors. A character recognition unit performs a character recognizing process based on the result of discriminating whether the character data is a hand-written character or a typed character. As a feature of the above described character pattern, the variance of line widths, the variance of character positions, etc. can also be used.

8 Claims, 17 Drawing Sheets

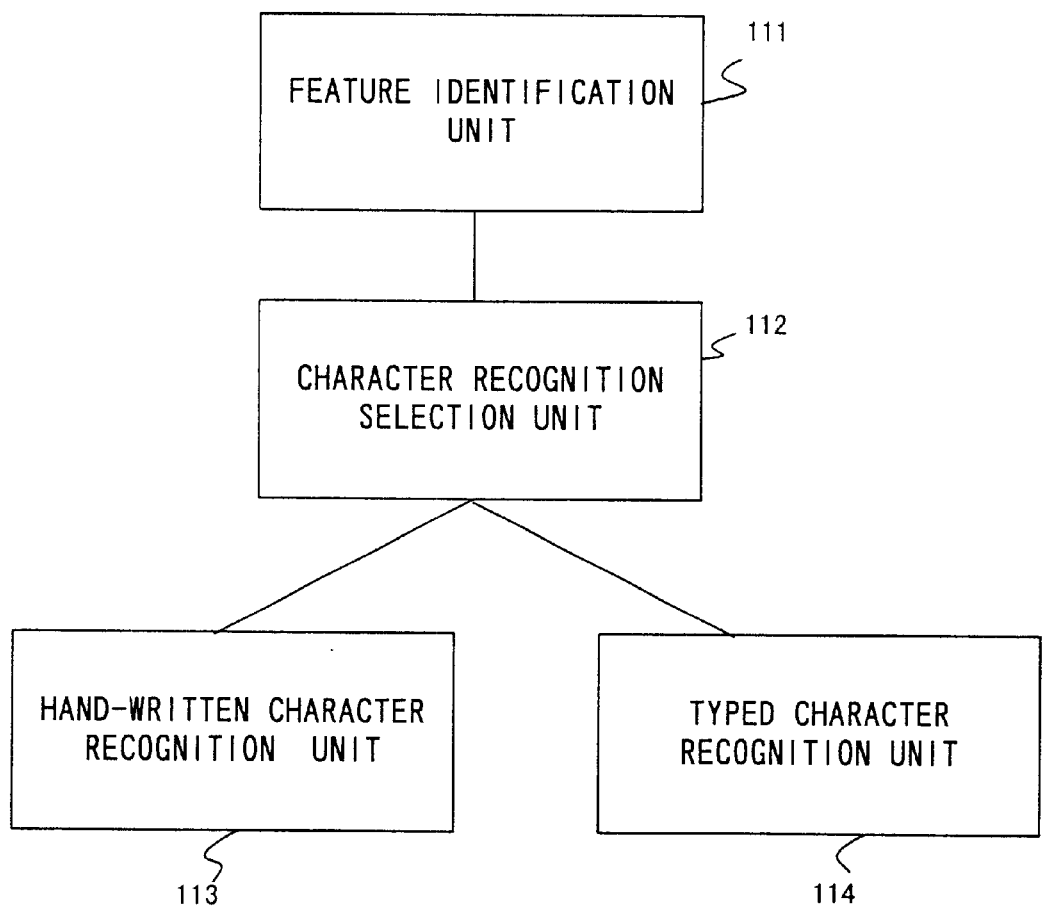
F I G. 1

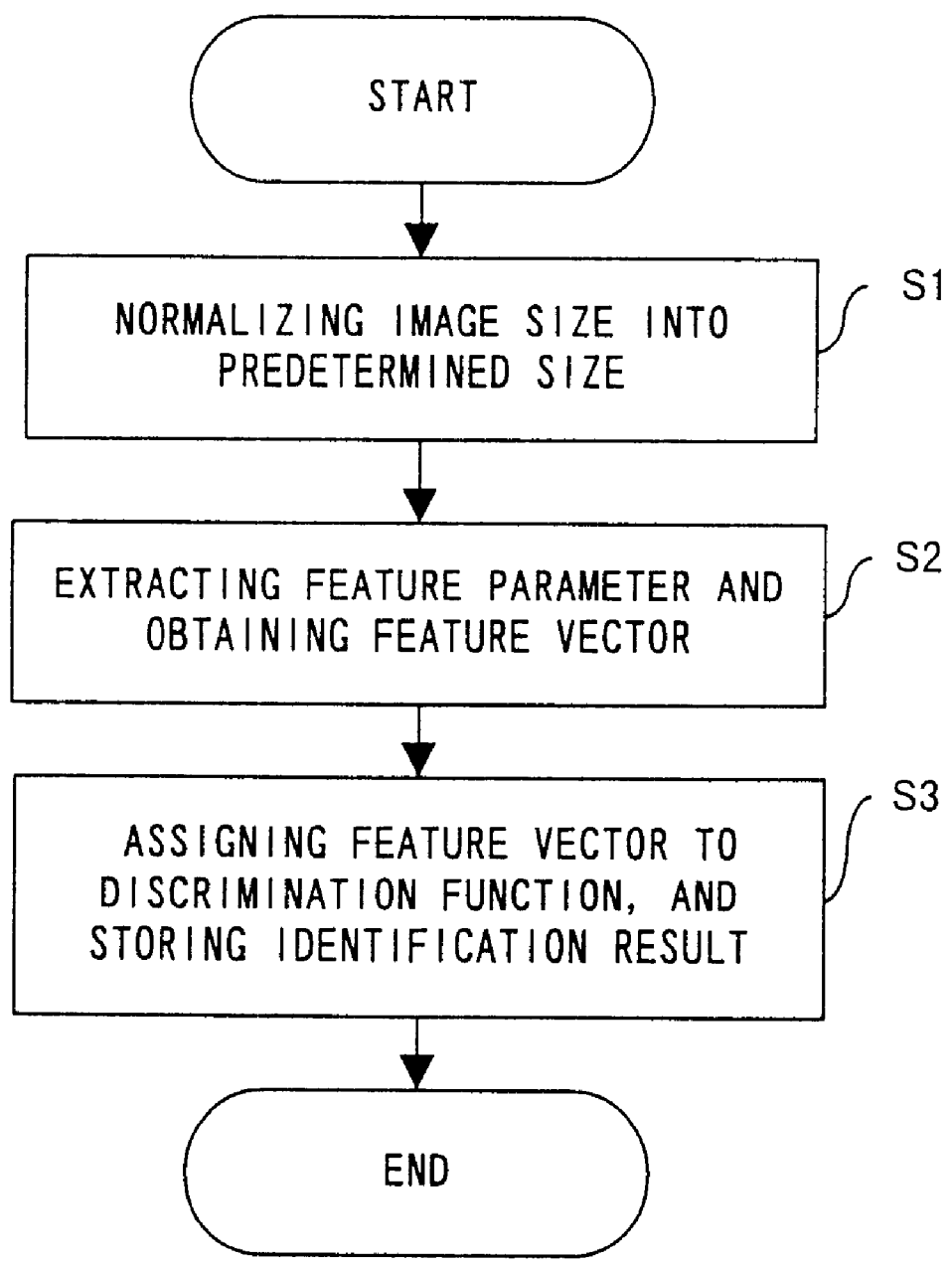
F I G. 6

|  | HAND-WRITTEN CHARACTER | | TYPED CHARACTER | | | |
|---|---|---|---|---|---|---|
|  | | | IMCHO | | GOTHICS | |
|  | KANJI | OTHER CHARACTER TYPES | KANJI | OTHER CHARACTER TYPES | KANJI | OTHER CHARACTER TYPES |
| COMPLEXITY | LARGE | SMALL | LARGE | SMALL | LARGE | SMALL |
| LINEARITY | SMALL | SMALL | LARGE | INTER-MEDIATE | LARGE | INTER-MEDIATE |
| VARIANCE OF LINE WIDTHS | LARGE | LARGE | SMALL | SMALL | SMALL | SMALL |
| VARIANCE OF CHARACTER POSITIONS | LARGE | LARGE | SMALL | SMALL | SMALL | SMALL |

F I G. 7

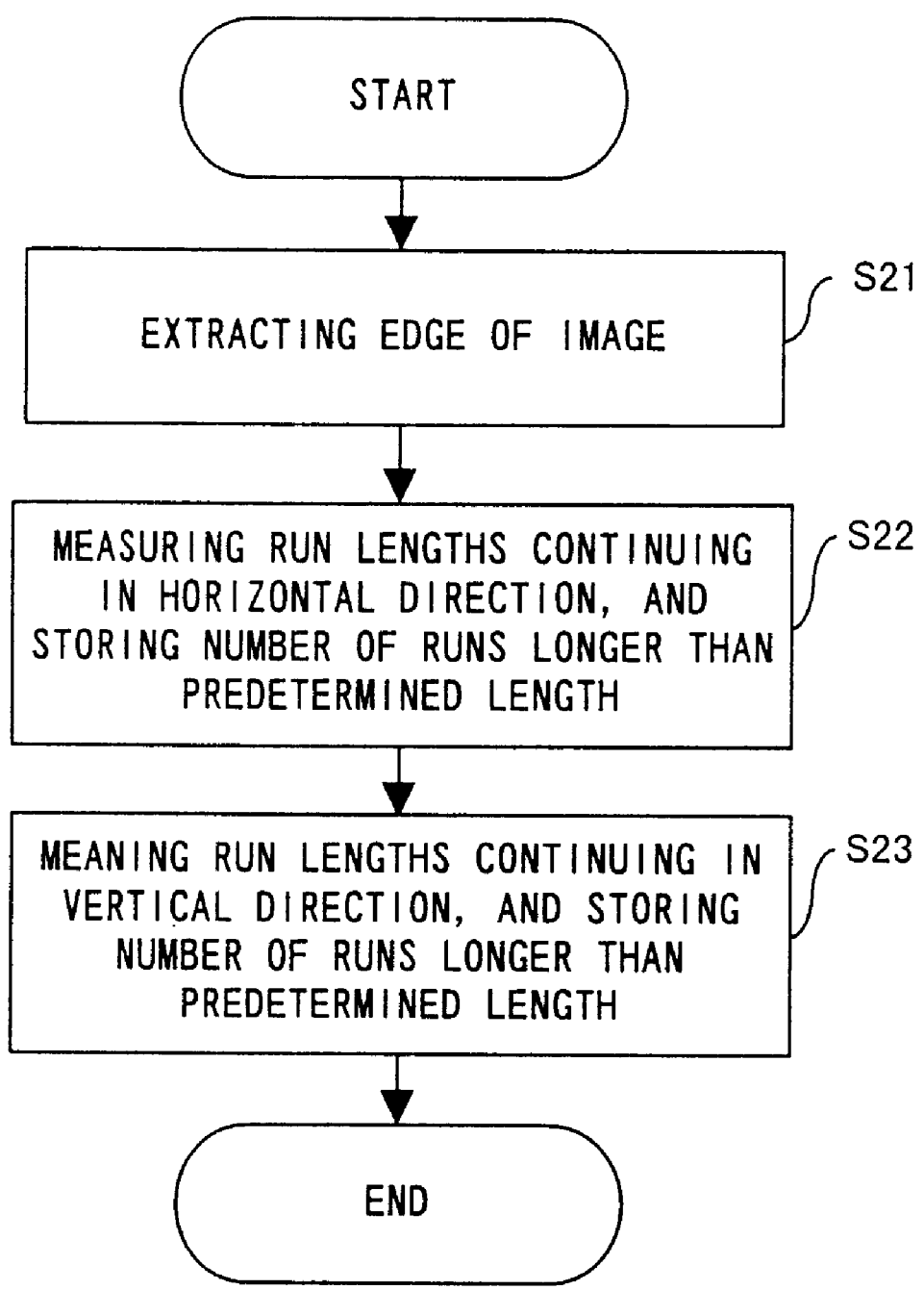
F I G. 12

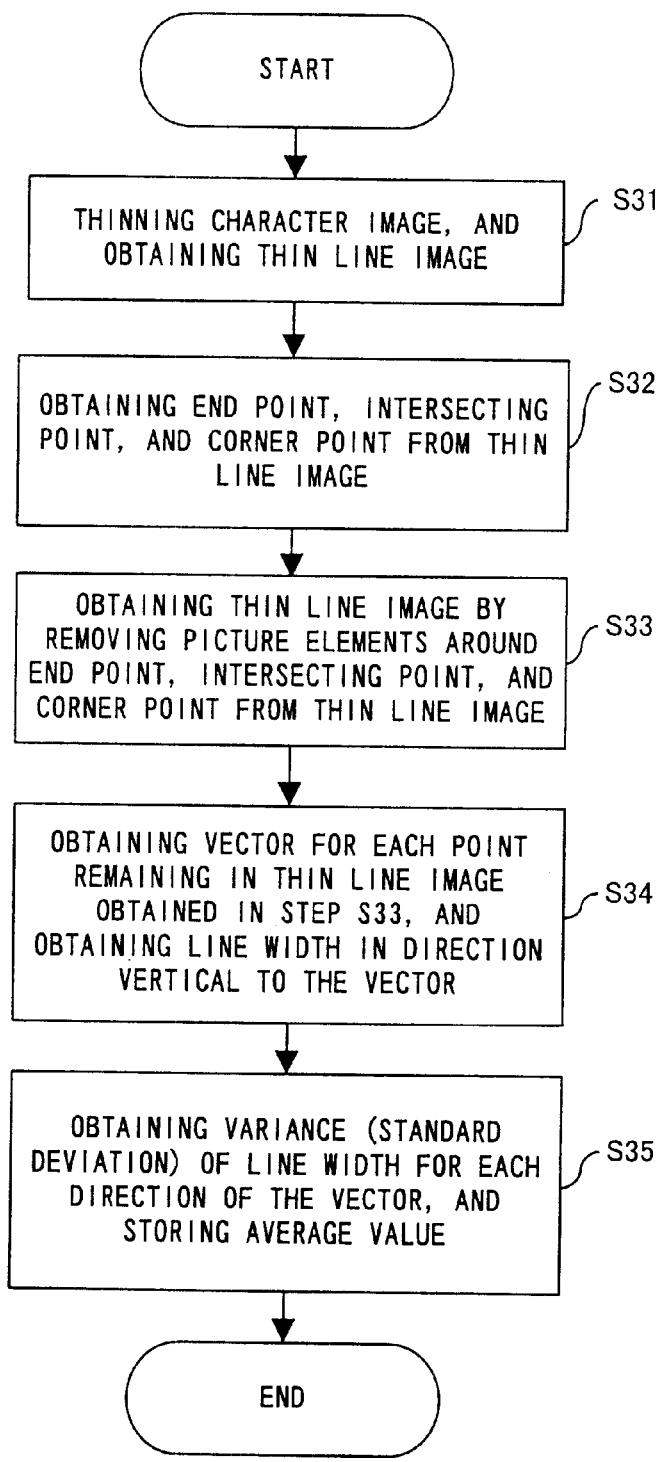
F I G. 14

2028866 —— COORDINATES OF BOTTOM LINE OF TYPED CHARACTERS

/94 /95 ----- COORDINATES OF BOTTOM LINE OF HAND-WRITTEN CHARACTERS

APPARATUS AND METHOD FOR RECOGNIZING CHARACTER

BACKGROUND OF THE INVENTION

1. Field of the Invention

Recently, the demand for advanced character recognition technology for peripheral input devices has become very strong. The present invention relates to an apparatus and a method of recognizing a character, and a storage medium for storing a character recognition program. Specifically, the present invention relates to an apparatus and a method of recognizing characters by distinguishing hand-written characters from typed characters in a document to more precisely recognize the characters, and a storage medium for storing the character recognition program.

2. Description of the Related Art

To recognize a document containing both hand-written characters and typed characters in the conventional technology, two processes, that is, a process of recognizing hand-written characters and a process of recognizing typed characters, are first performed. Then, the two process results are compared with each other to obtain a recognition result of higher reliability, thereby recognizing the document.

The above described conventional technology obtains a recognition result of high reliability by performing two processes (separately recognizing hand-written characters and typed characters), and then comparing the recognition results of the two processes. Therefore, there has been the problem with the conventional technology that it takes a long time to perform the recognizing processes.

SUMMARY OF THE INVENTION

The present invention has been developed to solve the above described problem with the conventional technology, and aims at recognizing both hand-written characters and typed characters at high precision, and shortening the time required to perform the character recognizing process.

To solve the above described problem, the present invention recognizes the features of a pattern, performs a process of recognizing hand-written characters when the features of the pattern imply hand-written characters, and performs a process of recognizing typed characters when the feature of the pattern imply typed characters.

Thus, even when a document contains both hand-written characters and typed characters, a precise recognition result can be obtained only by performing only one of the hand-written characters recognizing process and the typed characters recognizing process, thereby successfully shortening the time required to perform the character recognizing process without lowering the precision in recognizing characters.

According to an aspect of the present invention, a hand-written character or a typed character can be discriminated based on the form or the regularity of a pattern.

Since typed characters are more regular in pattern shape and arrangement than hand-written characters, hand-written characters can be distinguished from typed characters by checking the regularity in pattern shape and arrangement, thereby shortening the time taken for performing the subsequent processes.

BRIEF DESCRIPTION OF THE DRAWINGS

FIG. 1 is a block diagram of the configuration of the character recognition apparatus according to the first embodiment of the present invention;

FIG. 6 is a flowchart of the process performed by the hand-written/typed character discrimination unit;

FIG. 7 shows the relationship between each character type/set and a feature parameter;

FIG. 12 is a flowchart of the linearity extracting process according to an embodiment of the present invention;

FIG. 14 is a flowchart of the line width variance extracting process according to an embodiment of the present invention;

DESCRIPTION OF THE PREFERRED EMBODIMENTS

Figure 2:
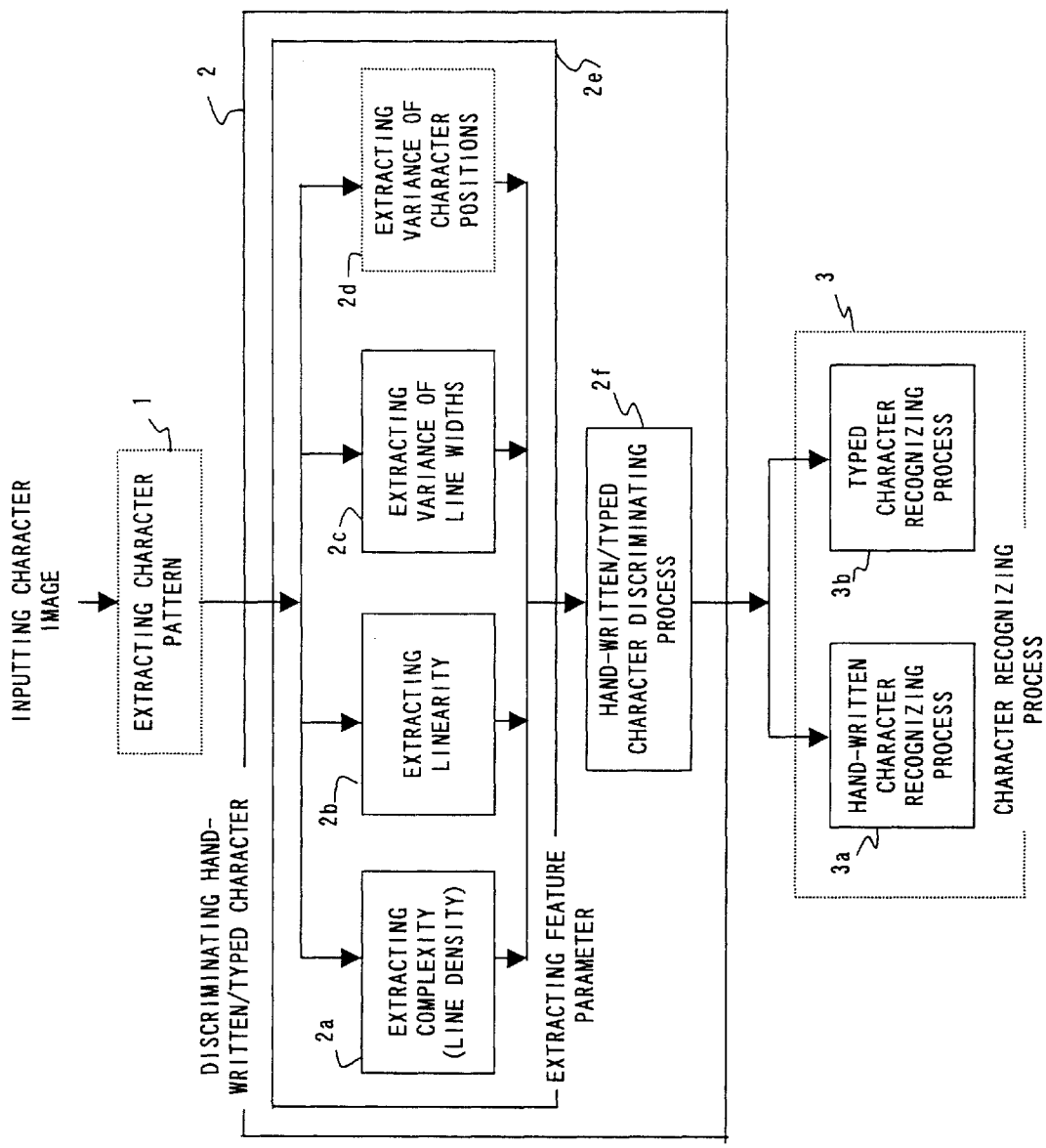
FIG. 2 is a block diagram of the configuration of the character recognition apparatus according to the second embodiment of the present invention.

The character recognition apparatus according to an embodiment of the present invention is described below by referring to the attached drawings. FIG. 1 is a block diagram of the configuration of the character recognition apparatus according to the first embodiment of the present invention. In FIG. 1, a feature identification unit 111 identifies the feature of the pattern extracted from an input image. For example, the feature identification unit 111 discriminates based on the regularity of the pattern whether the pattern is a hand-written character or a typed character. That is, since typed characters have high regularity than hand-written characters, the feature identification unit 111 determines that the pattern is a typed character when the regularity of the pattern is high, and determines that the pattern is a hand-written character when the regularity of the pattern is low.

The features of a pattern identified by the feature identification unit 111 are the complexity of the pattern, the linearity of the pattern, the variance of the line widths of the pattern, the variance of the arrangement positions of the pattern, the variance of the tilts of the pattern, the variance of the sizes of the pattern, etc. The complexity of a pattern can be identified based on the line density of the pattern, the density of the black picture elements, the Euler number, the outline length, etc. The features of a pattern can be identified by combining a plurality of features through a discrimination analysis, etc.

The hand-written character recognition unit 113 recognizes hand-written characters. The typed character recognition unit 114 recognizes typed characters. Typed characters can be printed characters, type-written characters, characters input by a word-processor, etc.

The character recognition selection unit 112 selects the hand-written character recognition unit 113 or the typed character recognition unit 114 based on the discrimination result by the feature identification unit 111. That is, when the feature identification unit 111 determines that the pattern to be recognized is a hand-written character, the character recognition selection unit 112 selects the hand-written character recognition unit 113, and instructs the hand-written character recognition unit 113 to recognize the character of the pattern to be recognized. When the feature identification unit 111 determines that the pattern to be recognized is a typed character, the character recognition selection unit 112 selects the typed character recognition unit 114, and instructs the typed character recognition unit 114 to recognize the character of the pattern to be recognized.

Thus, it is possible to perform the character recognizing process using either the hand-written character recognition unit 113 or the typed character recognition unit 114, thereby shortening the time taken to perform the character recognizing process, and preventing the recognition precision from being lowered even when only one of the hand-written character recognition unit 113 and the typed character recognition unit 114 is used to perform the character recognizing process.

FIG. 2 is a block diagram of the configuration of the character recognition apparatus according to the second embodiment of the present invention. As shown in FIG. 2, the second embodiment solves the above described problem.

A character pattern extraction unit 1 extracts a character pattern from an image of a document or a listing. Then, a complexity extraction unit 2a and a linearity extraction unit 2b obtain the Nth feature vector containing at least the feature indicating the complexity and the linearity of the character pattern. Next, a hand-written/typed character discriminating unit 2f discriminates whether the character pattern refers to a hand-written character or a typed character using the above described feature vector. Based on the discrimination result, a character recognizing unit 3 performs the hand-written character recognizing process or the typed character recognizing process. The line density can be used as the feature indicating the complexity of a character pattern. From the character pattern extracted by the character pattern extraction unit 1, a line width variance extraction unit 2c extracts the feature amount indicating the variance of the line width obtained by removing a pattern within a predetermined distance from an end point, an intersecting point, and a corner point of the character stroke contained in the character pattern. Then, it is discriminated according to the feature amount whether the character pattern is a hand-written character or a typed character. Based on the discrimination result, the hand-written character recognizing process or the typed character recognizing process can be performed.

Since typed characters can be represented in such fonts as Mincho characters in which there are different line widths in each stroke direction, the line width variance extraction unit 2c can obtain the variance of line widths for each stroke or for each stroke direction.

A character position variance extraction unit 2d obtains the variance of character positions. When a character pattern indicates a large variance of character positions, the hand-written/typed character discriminating unit 2f determines that the pattern is a hand-written character, and instructs a hand-written character recognizing unit 3a to recognize the characters of the pattern. On the other hand, when a character pattern indicates a small variance of character positions, the hand-written/typed character discriminating unit 2f determines that the pattern is a typed character, and instructs a typed character recognizing unit 3b to recognize the characters of the pattern.

In addition to the variance of character positions, the variance of the tilts, sizes, etc. of characters can be checked to discriminate a character pattern whether it is a hand-written character or a typed character.

In the present embodiment, the N-th feature vector containing at least the feature indicating the complexity of a character pattern and the feature indicating the linearity of a character pattern is obtained to discriminate between a hand-written character and a typed character and recognize a character as a hand-written character or a typed character. Therefore, a hand-written character and a typed character can be discriminated with high precision, and a character recognizing process can be performed within a short time. Furthermore, by using the line density as the feature indicating the complexity of a character pattern, the feature amount can be obtained easily and at a high speed.

The variance of line widths can be obtained without the influence of the ornaments, etc. to Mincho characters by discriminating a hand-written character or a typed character using the feature amount indicating the variance of the line widths by removing the patterns within a predetermined distance from the end point, the intersecting point, and the corner point of a character stroke contained in the character pattern, thereby correctly discriminating a hand-written character or a typed character.

In addition, by obtaining the variance of line widths for each stroke or for each stroke direction, the variance of the line widths can be obtained without the influence of the difference in the line widths depending on the directions of strokes in Mincho characters, thereby correctly discriminating a hand-written character or a typed character.

Figure 3:
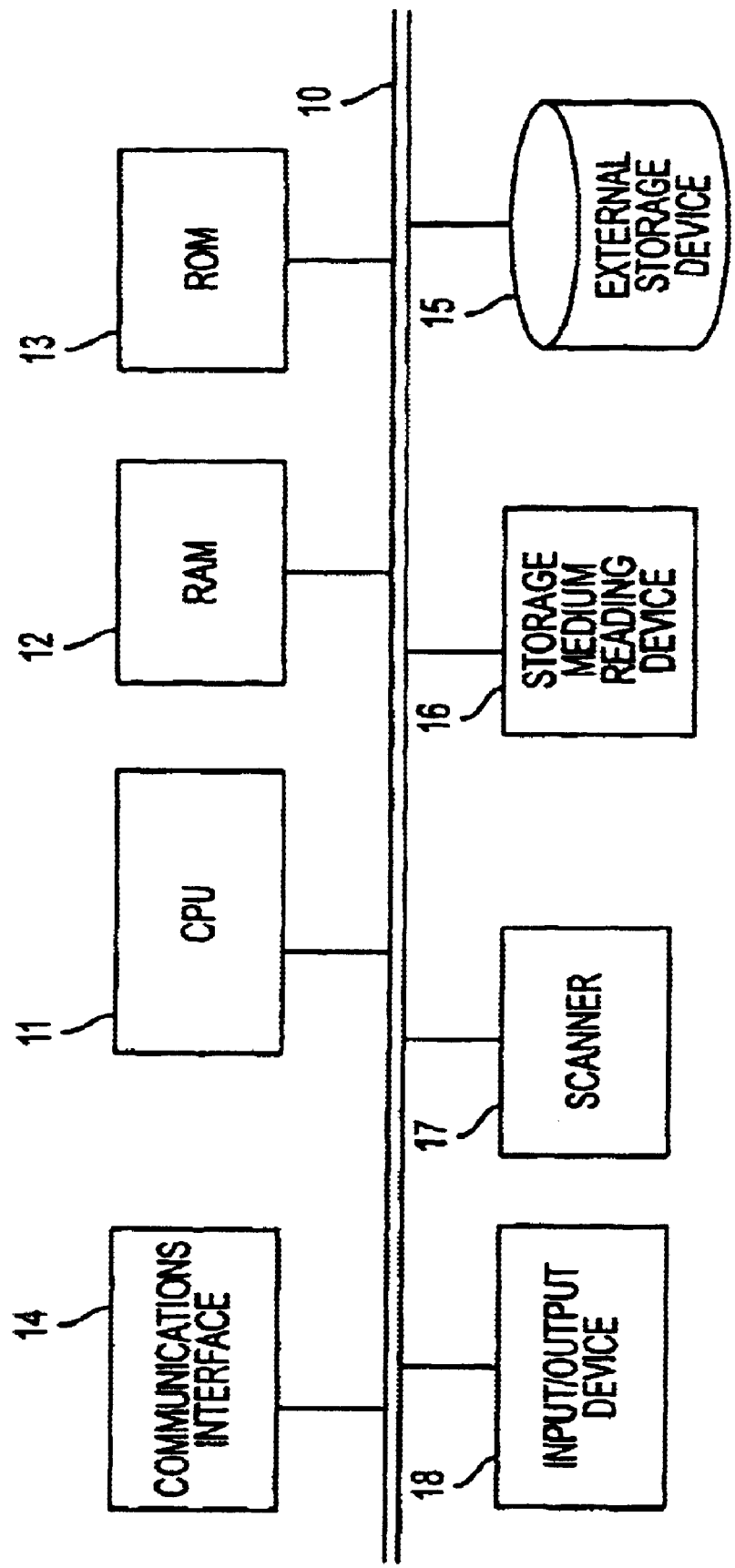
FIG. 3 shows an example of the configuration of a system to which the present invention is applied.

FIG. 3 shows an example of the configuration of the system to which the present invention is applied.

In FIG. 3, 11 is a CPU to which a bus 10 is connected. Connected to the bus 10 are RAM 12, ROM 13, an communications interface 14, an external storage device 15, a storage medium reading device 16, a scanner 17 for reading an image, an input/output device 18 such as a display, a keyboard, etc. The ROM 13 stores an OS, etc., and the RAM 12 stores a program, data, etc. for use in performing a process according to the present embodiment.

The scanner 17 reads an image in which a character to be recognized, etc. are stored. The input/output device 18 contains an input device such as a keyboard, a mouse, etc. and an output device such as a display monitor, a printer, etc., inputs data for use in processing data, and outputs the processed data.

A program, data, etc. for use in performing the character recognizing process are stored in the storage device 15 such as a hard disk, etc. or in the storage medium such as CD-ROM, a floppy disk, etc., read from the storage device 15 when the data are processed, or read from the storage medium by the reading device 17, stored in the RAM 12, and executed by the CPU 11. The communications interface 14 is connected to the bus 10, and can transmit and receive data and a program through a communications line.

Figure 4:
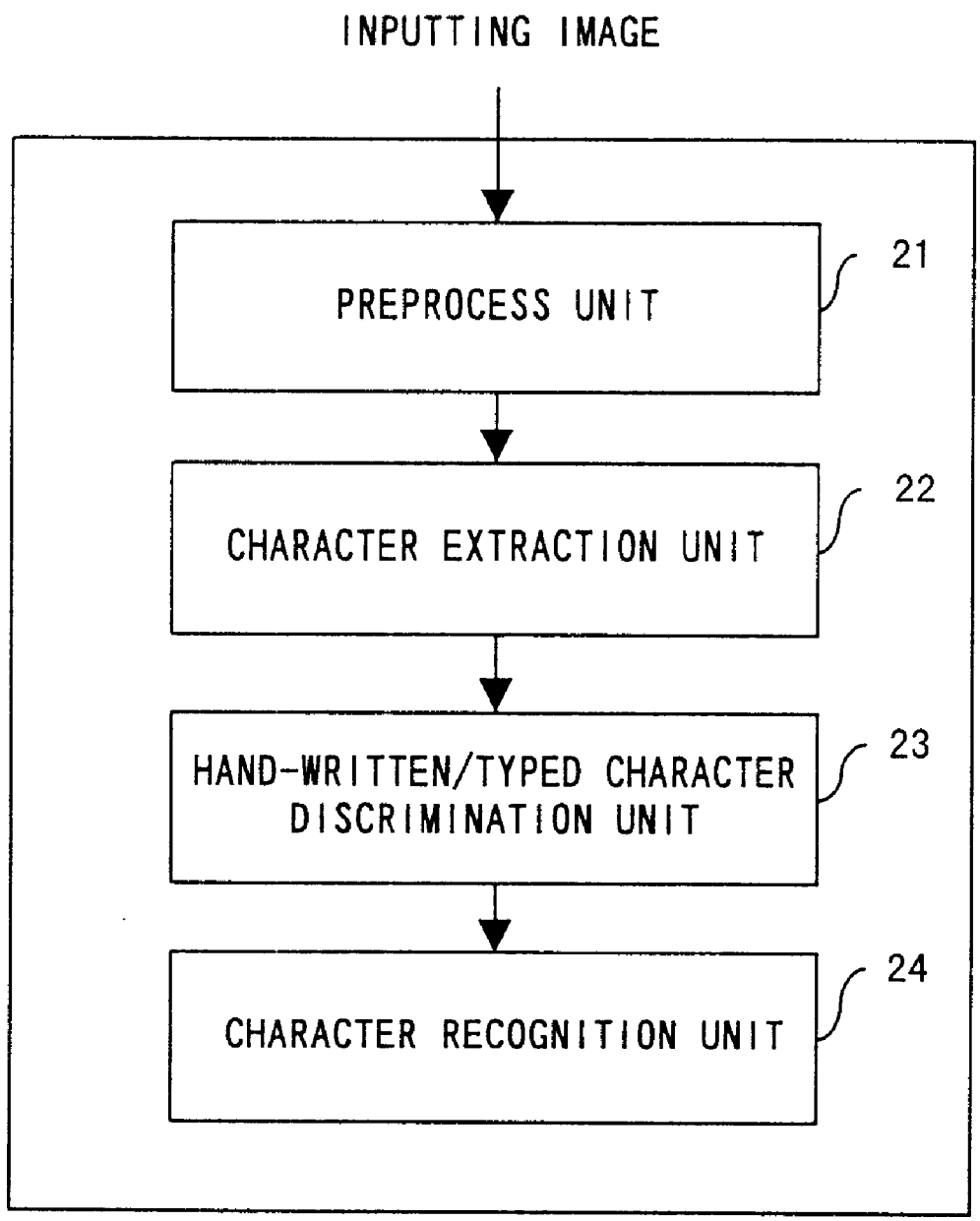
FIG. 4 is a block diagram of the configuration of the character recognition apparatus according to the third embodiment of the present invention.

FIG. 4 is a block diagram of the function performed by the character recognition apparatus according to the third embodiment of the present invention. As shown in FIG. 4, the character recognition apparatus according to the present embodiment comprises a preprocess unit 21 for preprocessing image data; a character extraction unit 22; a hand-written/typed character discrimination unit 23, and a character recognition unit 24 for performing a character recognizing process. The preprocess unit 21, the character extraction unit 22, and the character recognition unit 24 can be realized by the conventional well-known technology.

In FIG. 4, a preprocess such as a noise removing process, a tilt amending process, etc. is performed on the image data read from a document or a listing by an image input unit such as the scanner 17, etc., and the preprocessed data is transmitted to the character extraction unit 22. The character extraction unit 22 segments the character data from the preprocessed image data. The hand-written/typed character discrimination unit 23 discriminates the segmented character data between hand-written characters and typed characters, and divides the data into hand-written characters and typed characters.

The character recognition unit 24 performs a character recognizing process corresponding to hand-written characters or typed characters of the character data. That is, the character recognition unit 24 comprises the hand-written character recognition unit for recognizing hand-written characters and the typed characters recognition unit for recognizing typed characters. When the hand-written/typed character discrimination unit 23 recognizes character image data as hand-written characters, the above described hand-written character recognition unit recognizes character. When the hand-written/typed character discrimination unit 23 recognizes the character image data as typed characters, the above described typed character recognition unit recognizes characters. Thus, the time required to recognize characters can be successfully shortened by preliminarily discriminating whether a character pattern refers to hand-written characters or typed characters, and by the character recognition unit 24 performing the recognizing process based on the discrimination result.

In the above described character extracting process and hand-written character/typed character discriminating process, character data can be segmented for each character, and the hand-written character/typed character discriminating process can be performed on each of the segmented characters. Otherwise, a plurality of characters can be segmented to be collectively processed in the hand-written character/typed character discriminating process.

Figure 5:
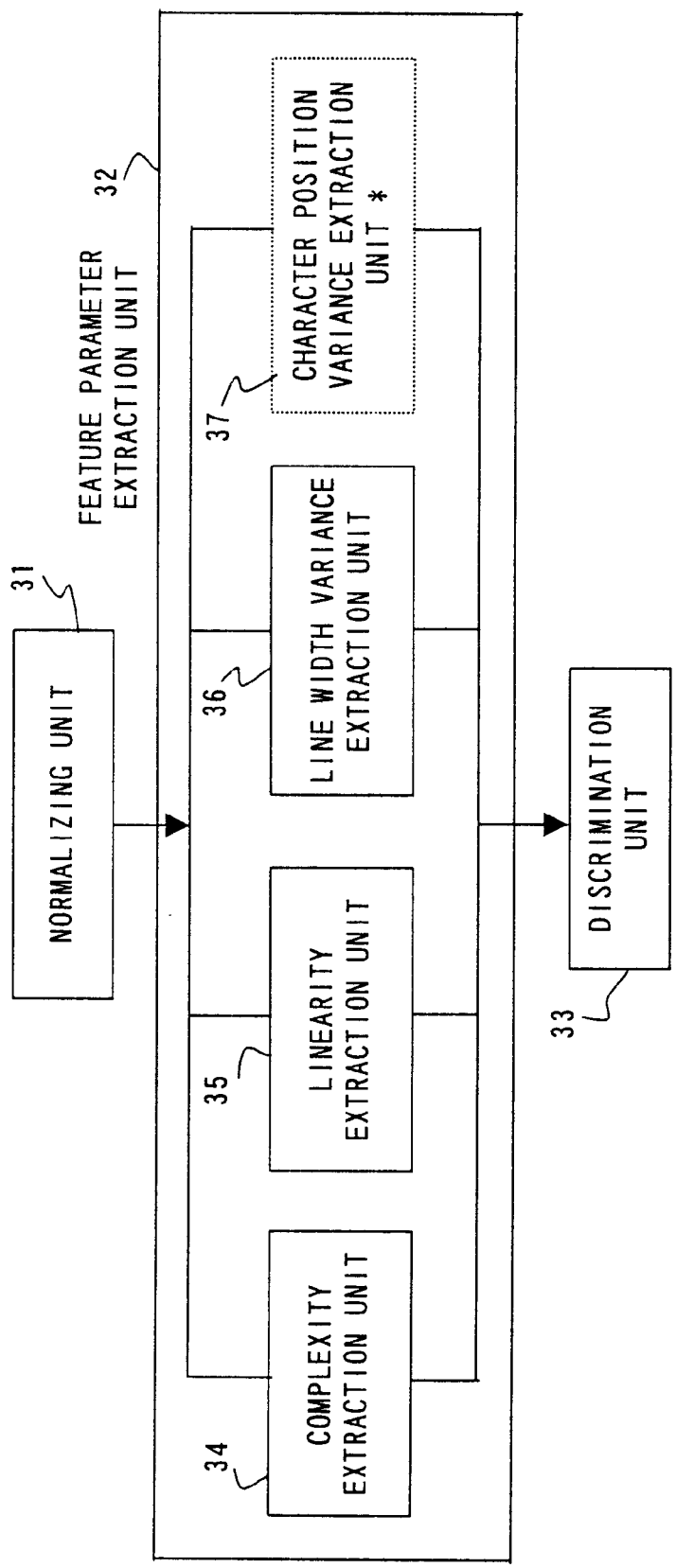
FIG. 5 shows the configuration of the hand-written/typed character discrimination unit according to an embodiment of the present invention.

FIG. 5 shows the configuration of the hand-written/typed character discrimination unit 23. FIG. 6 is a flowchart showing the outline of the process performed by the hand-written/typed character discrimination unit 23.

As shown in FIG. 5, the hand-written/typed character discrimination unit 23 comprises a normalizing unit 31 for normalizing segmented character data; a feature parameter extraction unit 32 for extracting a feature parameter from the segmented character data; and a discrimination unit 33 for identifying a hand-written character or a typed character.

The feature parameter extraction unit 32 comprises a complexity extraction unit 34, a linearity extraction unit 35, a line width variance extraction unit 36, and a character position variance extraction unit 37.

The hand-written/typed character discrimination unit 23 performs the hand-written character/typed character discriminating process as follows.

First, the normalizing unit 31 normalizes the size of images (step S1).

Then, the feature parameter extraction unit 32 extracts a feature parameter indicating, for example, the complexity of a character, the linearity of character data, the variance of line widths of characters, the variance of character positions, etc. from the normalized character data, and obtains a feature vector (step S2).

Next, the discrimination unit 33 assigns a feature vector to a discriminant function, identifies a hand-written character or a typed character, and stores the identification result (step S3).

The discrimination unit 33 performs the process of identifying a hand-written character and a typed character by preliminarily obtaining a boundary for identifying a hand-written character and a typed character by performing discriminating and analyzing processes in a feature vector space containing feature parameters as elements, and discriminating the character by determining which side of the boundary the feature vector is located according to the feature parameter extracted from the character data.

FIG. 7 shows the relationship between each character type/set and a feature parameter. The words 'large', 'medium', and 'small' in FIG. 7 indicate relative values of the character types/sets when the feature parameters are represented by values.

(1) The feature parameter indicating 'complexity' is large for Kanji (Chinese character) and small for other character type (alphabetic, numeric, Hirakana (Japanese character), and Katakana (Japanese character)) regardless of hand-written characters and typed characters.

(2) The feature parameter indicating the 'linearity' is small for hand-written characters, and intermediate or large for typed characters.

(3) The feature parameter indicating the 'variance of line widths' is normally large for hand-written characters, and small for typed characters. In the typed characters, the variance of line widths of Mincho characters is large when a character contains an end point or a corner point. However, as described later, the variance of line widths of a character excluding an end point or a corner point is small as shown in FIG. 7. In addition, since the line widths of a character of Mincho characters are different for respective directions, the variance of line widths can be smaller if the variance of line widths is obtained for each direction.

(4) The feature parameter indicating the 'variance of character positions' is normally large for hand-written characters, and small for typed characters.

As described above, hand-written characters normally have less linear elements, and typed characters normally have more linear elements. Specifically, more linear elements are contained in Kanji characters, and less linear elements are contained in other character sets such as alphabetic, numeric, Hirakana, and Katakana characters.

Therefore, hand-written characters and typed characters can be precisely discriminated based on the complexity of characters as the feature amount with which Kanji is separated from other character types, and based on the linearity which is the feature of typed characters.

A parameter indicating the complexity can be the number of strokes, etc., but it is desired to use the line density of a character pattern for a high-speed process as described below.

Figure 8:
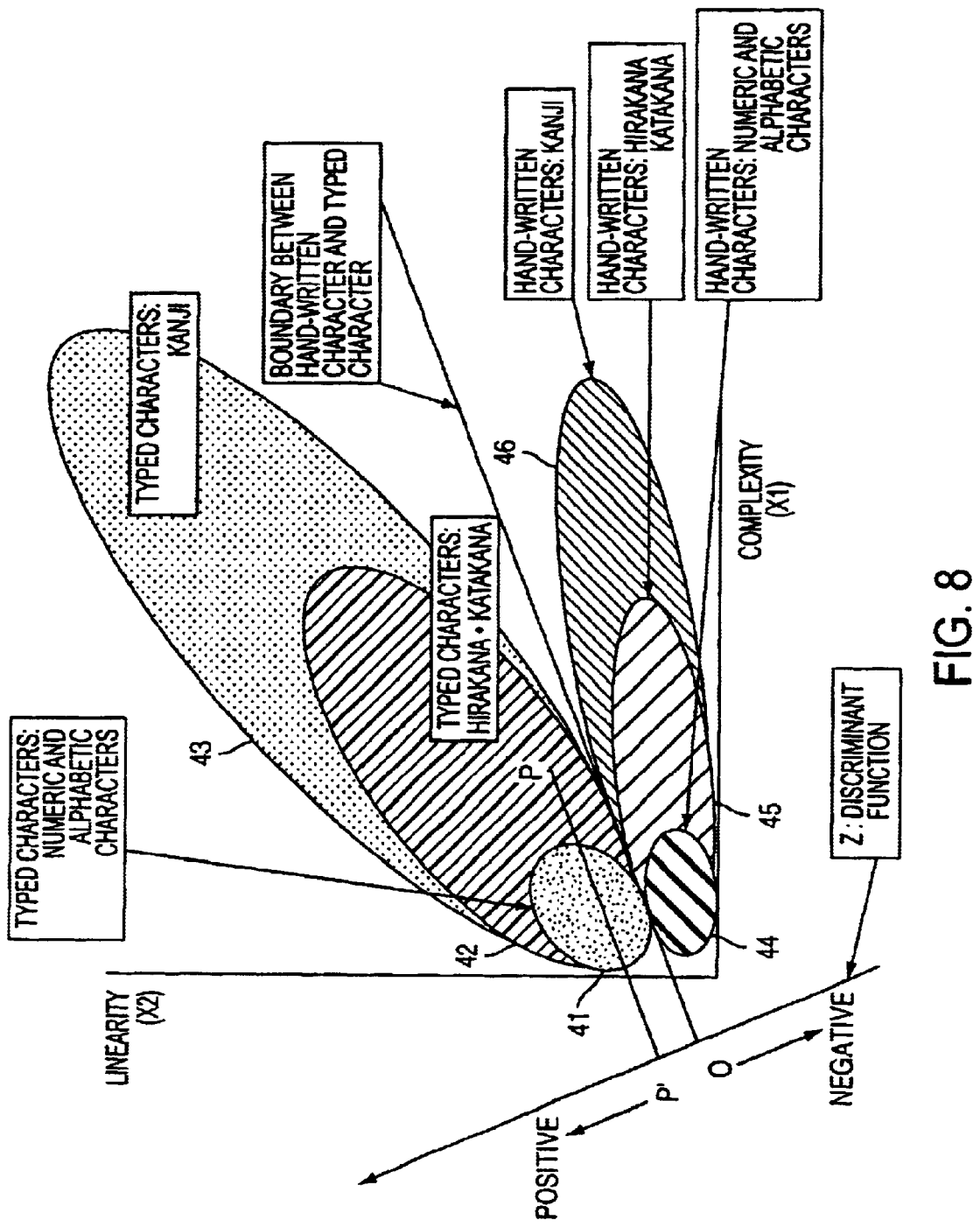
FIG. 8 shows the method of discriminating a hand-written character and a typed character.

FIG. 8 shows the above described discriminating method. It shows an example of a discriminant function for use in selecting the 'complexity X1' and the 'linearity X2' as feature parameters, and discriminating between hand-written characters and typed characters on the two-dimensional plane with the 'complexity X1' and the 'linearity X2' set as a horizontal axis and a vertical axis respectively.

The complexity and the linearity are obtained for various hand-written characters and typed characters. When the results are plotted on the above described two-dimensional plane, the numeric, alphabetic, Hirakana, Katakana and Kanji typed characters are normally distributed at the upper left portions 41, 42, and 43 on the two-dimensional plane as shown in FIG. 8. On the other hand, the numeric, alphabetic, Hirakana, Katakana and Kanji hand-written characters are normally distributed at the lower right portions 44, 45, and 46.

Therefore, in this case, hand-written characters can be discriminated from typed characters according to the above described two feature parameters by defining the discriminant function Z as shown in FIG. 8.

Assuming that a group of typed characters is represented by G1, and a group of hand-written characters is represented by G2, the distance (Mahalanobis distance) of each group from the center of gravity vector with the variance of each change amount and the correlation between change amounts taken into account is obtained by equations (1) and (2) as follows.

Mahalanobis distance of $G_1$:

$$D_1^2 = (X - \overline{X_1})' \Sigma_1^{-1} (X - \overline{X_1}) \quad (1)$$

Mahalanobis distance of $G_2$:

$$D_2^2 = (X - \overline{X_2})' \Sigma_2^{-1} (X - \overline{X_2}) \quad (2)$$

$\overline{x}_k$: center of gravity vector of group k
$\Sigma_k$: variance-covariance matrix of group k $$Z = D_2^2 - D_1^2 \quad (3)$$

For an unknown vector, the Mahalanobis distance to each of the groups is obtained to discriminate a closer group.

Therefore, the discriminant function is obtained by solving the equation (3) above, and the group can be discriminated depending on whether Z is positive or negative. For example, when the feature vector of an unknown pattern is located at the point P on the two-dimensional plane, it is checked whether the point P' obtained by projecting the point P on the discriminant function Z is positive or negative. If the point P' is positive, then the unknown pattern is discriminated as a typed character. If the point P' is negative, then the unknown pattern is discriminated as a hand-written character.

In FIG. 8, as described by referring to the two-dimensional plane using the two feature amounts of complexity and linearity, a character pattern can be discriminated with high precision by discriminating a hand-written character or a typed character by the discriminating and analyzing method described by referring to FIG. 8 normally on the N-dimensional feature vector space.

That is, as described above, the feature amount of the complexity, the linearity, the variance of line widths, the variance of character positions, etc. depends on a hand-written character, a typed character, a character type, or a character set. Therefore, by appropriately combining the plurality of feature parameters, a hand-written character or a typed character can be discriminated with higher precision.

As described later, a character can be identified with higher precision by obtaining the feature amount of the complexity, the linearity, the variance of line widths, etc. for each stroke or each direction of a stroke, and by discriminating a hand-written character or a typed character using the feature amounts. Another feature amount can also be used in combination with the feature amount of the tilt of a character.

In FIG. 7, the feature amount indicating the variance of line widths is large for hand-written characters and small for typed characters. Thus, using a single or a plurality of feature parameters having quite different feature amounts between a hand-written character and a typed character, the hand-written character or the typed character can be discriminated.

Figure 9A:
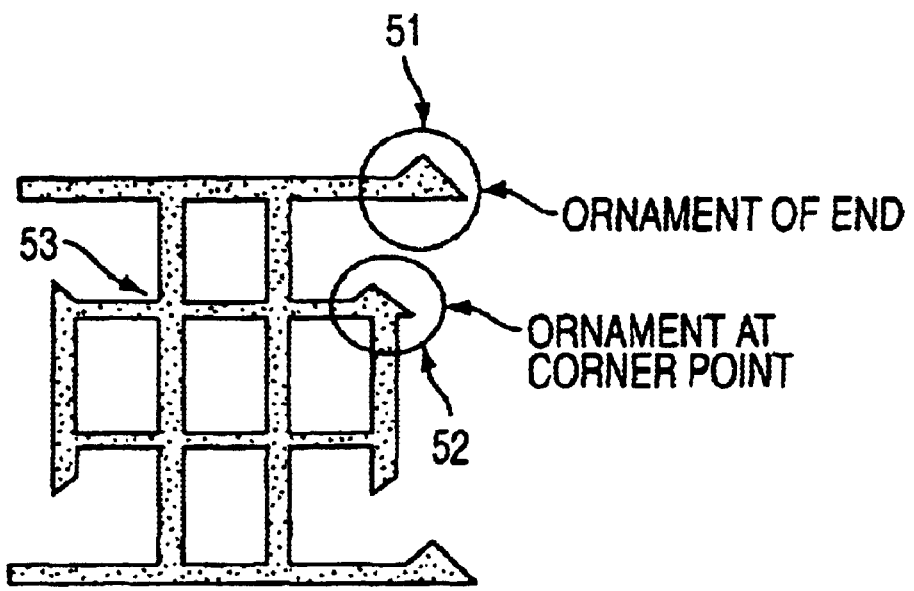
FIGS. 9A and 9B show the variance if line widths in Mincho characters.

In Mincho characters, ornaments are added to a character at an end point 51 and a corner point 52 of a stroke as shown in FIG. 9A. Therefore, when the end point 51 and the corner point 52 in Mincho characters are included in computing the variance of line widths, the variance of line widths becomes larger, thereby mistaking a typed character for a hand-written character.

Figure 9B:
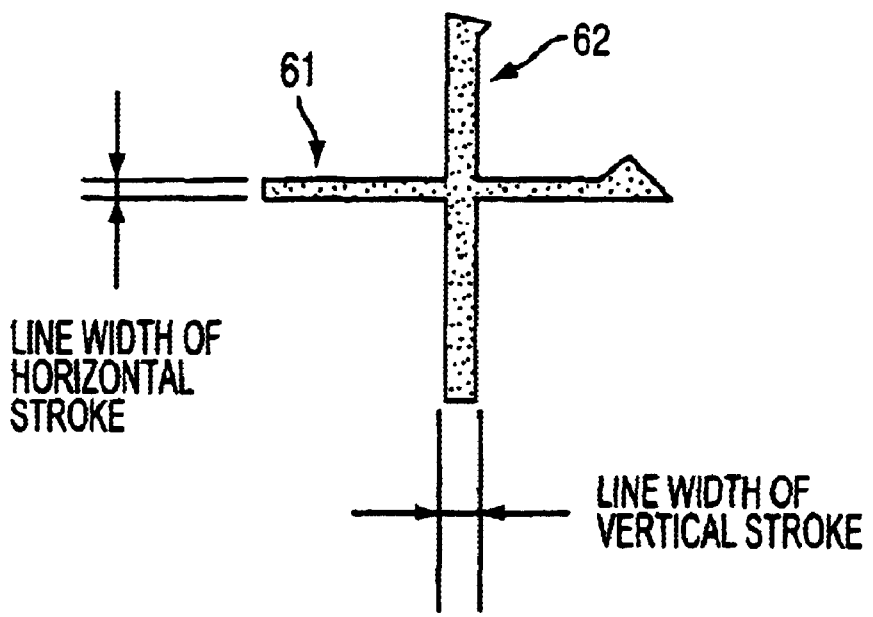

As described later, the end point 51, the intersecting point 53, and the corner point 52 of a stroke are obtained, and a predetermined length is subtracted from these points, thereby obtaining the variance of line widths of strokes. In Mincho characters, the line widths are different between the directions of strokes 61 and 62 as shown in FIG. 9B. Accordingly, the variance of line widths of strokes is obtained for the strokes 61 and 62 or the directions of the strokes 61 and 62.

Thus, the feature amount indicating the variance of line widths is obtained. Based on the obtained feature amount, a hand-written character or a typed character is identified, thereby performing the discriminating process with higher precision.

Described below is the process of extracting the above described various feature parameters.

(1) Extracting Complexity (Line Density) The complexity of a character is an effective parameter indicating the feature amount for use in discriminating a Kanji from other character types as described above. The complexity of a character can be obtained from the number of strokes, etc., but it is desired to obtain the complexity of a character based on the line density for an easier and higher-speed process. Described below is the process of extracting the complexity based on the line density.

Figure 10:
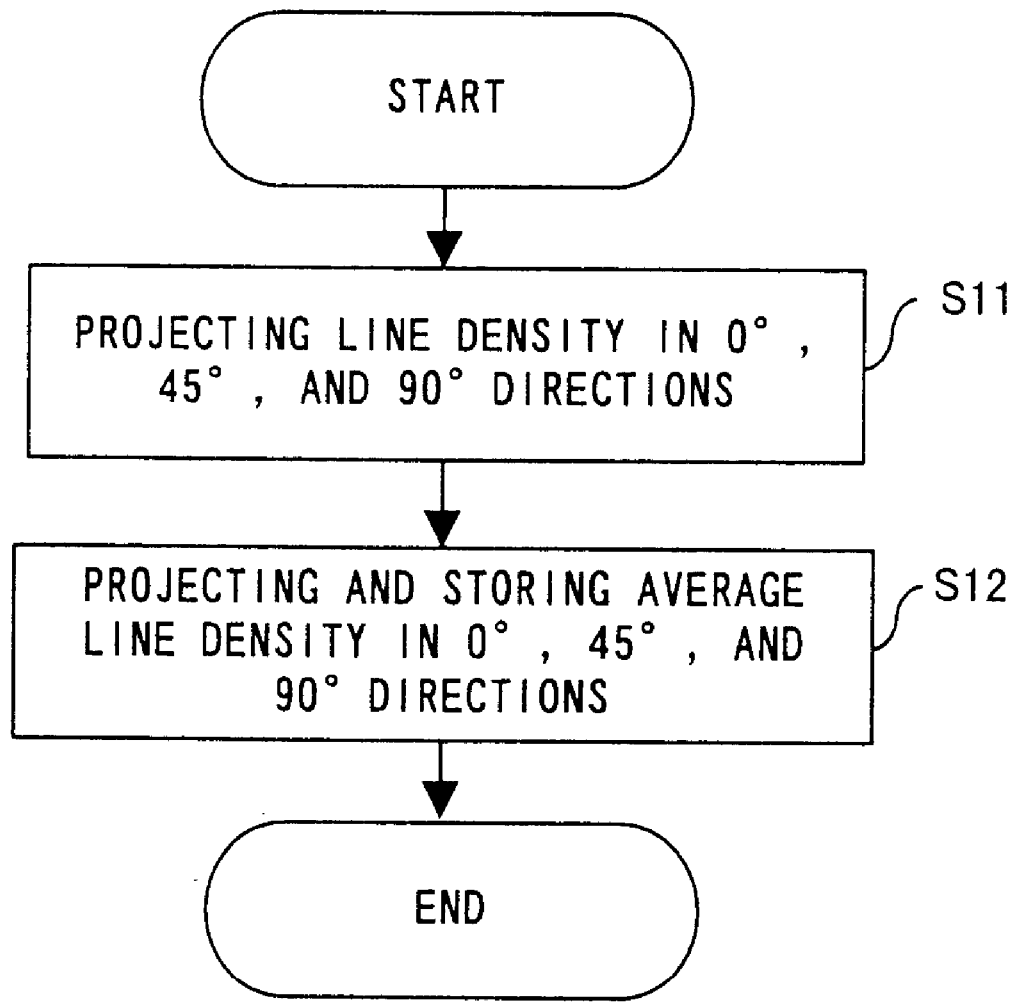
FIG. 10 is a flowchart of the complexity extracting process according to an embodiment of the present invention.
Figure 11:
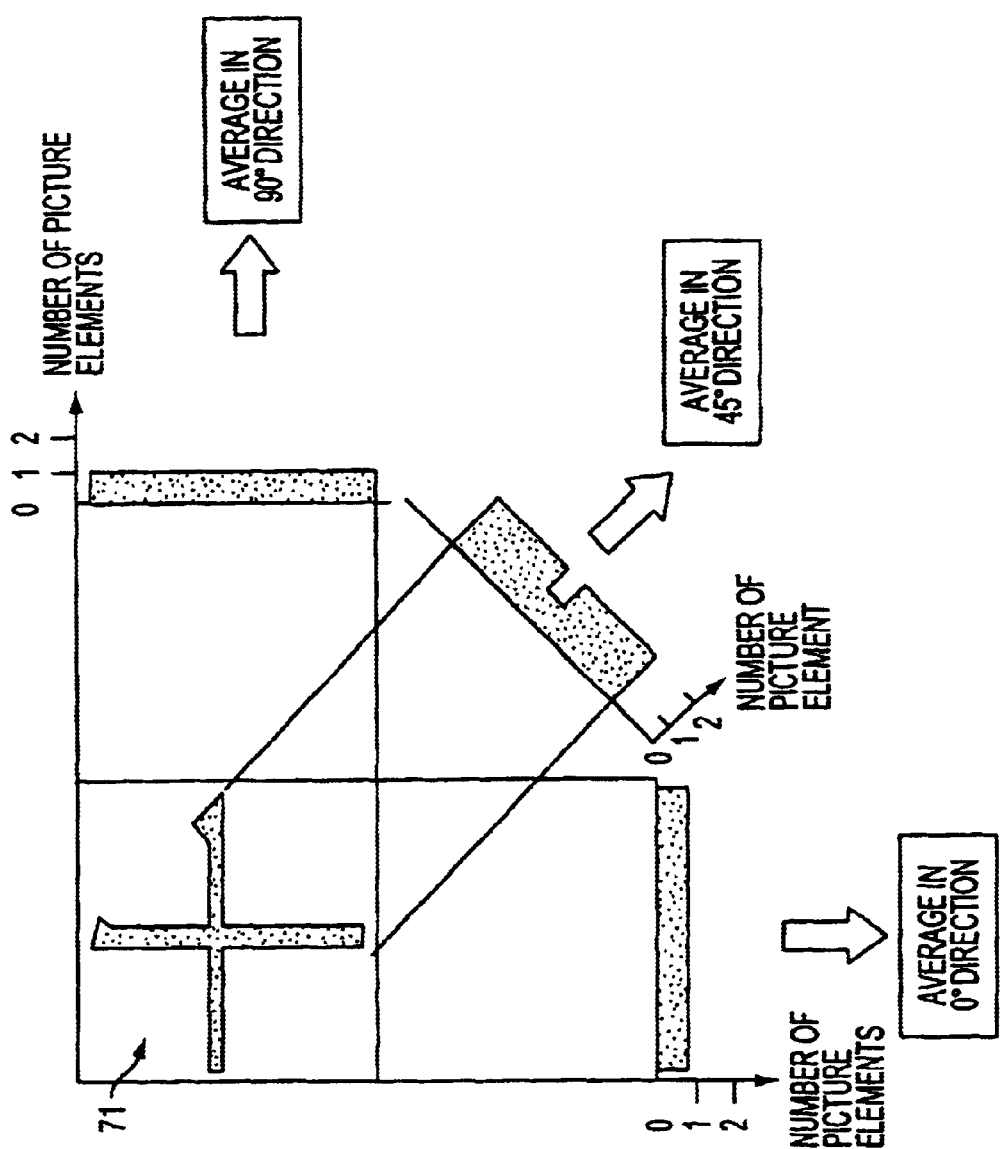
FIG. 11 shows the concept of the process of extracting the complexity (line density)

FIG. 10 is a flowchart of the complexity extracting process according to an embodiment of the present invention. FIG. 11 shows the concept of the process of extracting the complexity (line density).

To extract the complexity from character image data, the line density of the character data is projected in the 0°, 45°, and 90° directions as shown in FIGS. 10 and 11 (step S11). Then, the average of the line density based on the projections in the 0°, 45°, and 90° directions are obtained and stored (step S12).

For example, to obtain the line density in the 450 direction, the picture elements of character image data are diagonally scanned to obtain the number of picture elements where white picture elements change into black picture elements. In the case shown in FIG. 11, the number of picture elements where white picture elements change into black picture elements is 2 excluding the portion at the center of a character '†' 71. Since the portion at the center of the character is 1, the process is performed as shown in FIG. 11.

As described above, the line density is obtained for each direction, and an average of the obtained density values, thereby extracting the feature parameter corresponding to the complexity of the character image data.

(2) Extracting Linearity

Typed characters contains a lot of linear elements, and the linearity is an effective parameter when a typed character is discriminated from a hand-written character.

Figure 13:
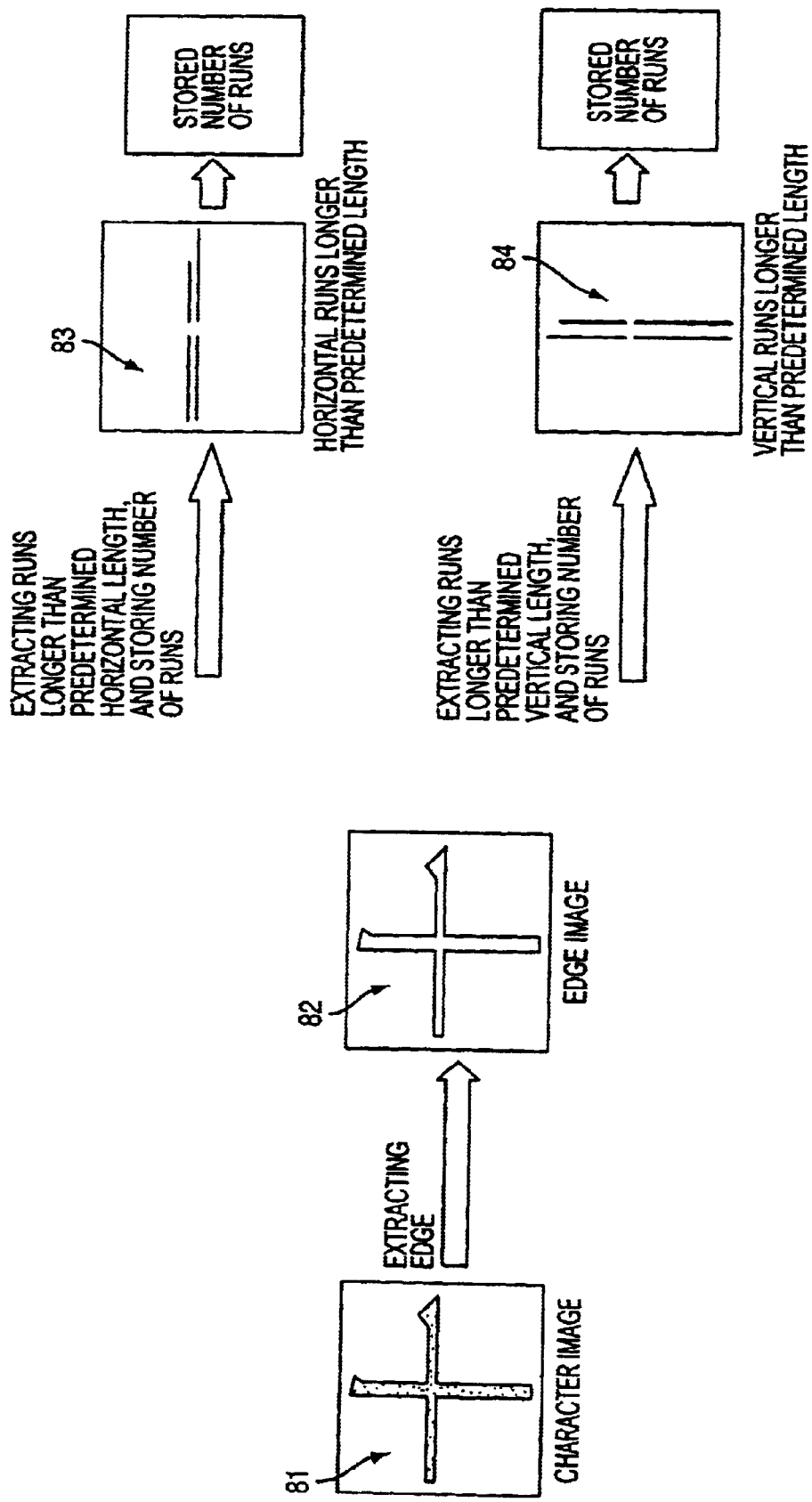
FIG. 13 shows the concept of the linearity extracting process.

FIG. 12 is a flowchart of the linearity extracting process according to the embodiment of the present invention. FIG. 13 shows the concept of the linearity extracting process.

To extract the linearity from character image data, the edge of the character image data is first extracted (step S21). For example, in the case of the character image '†' 81 shown in FIG. 13, an edge image 82 represented as a white character framed in black is extracted.

Then, the length of a horizontal run is measured, and the number of runs longer than a predetermined length is stored (step S22). In the example shown in FIG. 13, runs 83 longer than a predetermined length in the horizontal direction are extracted, and the number of the runs is stored.

Similarly, the length of continuous runs in the vertical direction is measured, and the number of runs longer than a predetermined length is stored (step S23). In the example shown in FIG. 13, runs 84 longer than a predetermined length in the vertical direction are extracted, and the number of them is stored.

As described above, runs longer than a predetermined length in the horizontal and vertical directions are extracted, and the number of them are counted, thereby extracting the feature parameter corresponding to the linearity for each direction.

(3) Extracting Variance of Line Widths

The variance of line widths of strokes can be an effective parameter for use in discriminating a hand-written character from a typed character. As described above, hand-written characters normally indicate a larger variance of line widths while typed characters normally indicate a smaller variance of line widths. However, in Mincho characters, ornaments are added to an end point and a corner point of a stroke. If these ornaments are counted in the computation of the variance of line widths, then the variance of line widths becomes larger, and a typed character is mistaken for a hand-written character.

In addition, in Mincho characters, the line width depends on the direction of a stroke as described above.

According to the present embodiment, an end point, an intersecting point, and a corner point of a stroke are obtained, a portion within a predetermined length from these points is removed, the variance of line widths of strokes is obtained, and the variance of line widths is obtained for each stroke or for each stroke direction.

Figure 15:
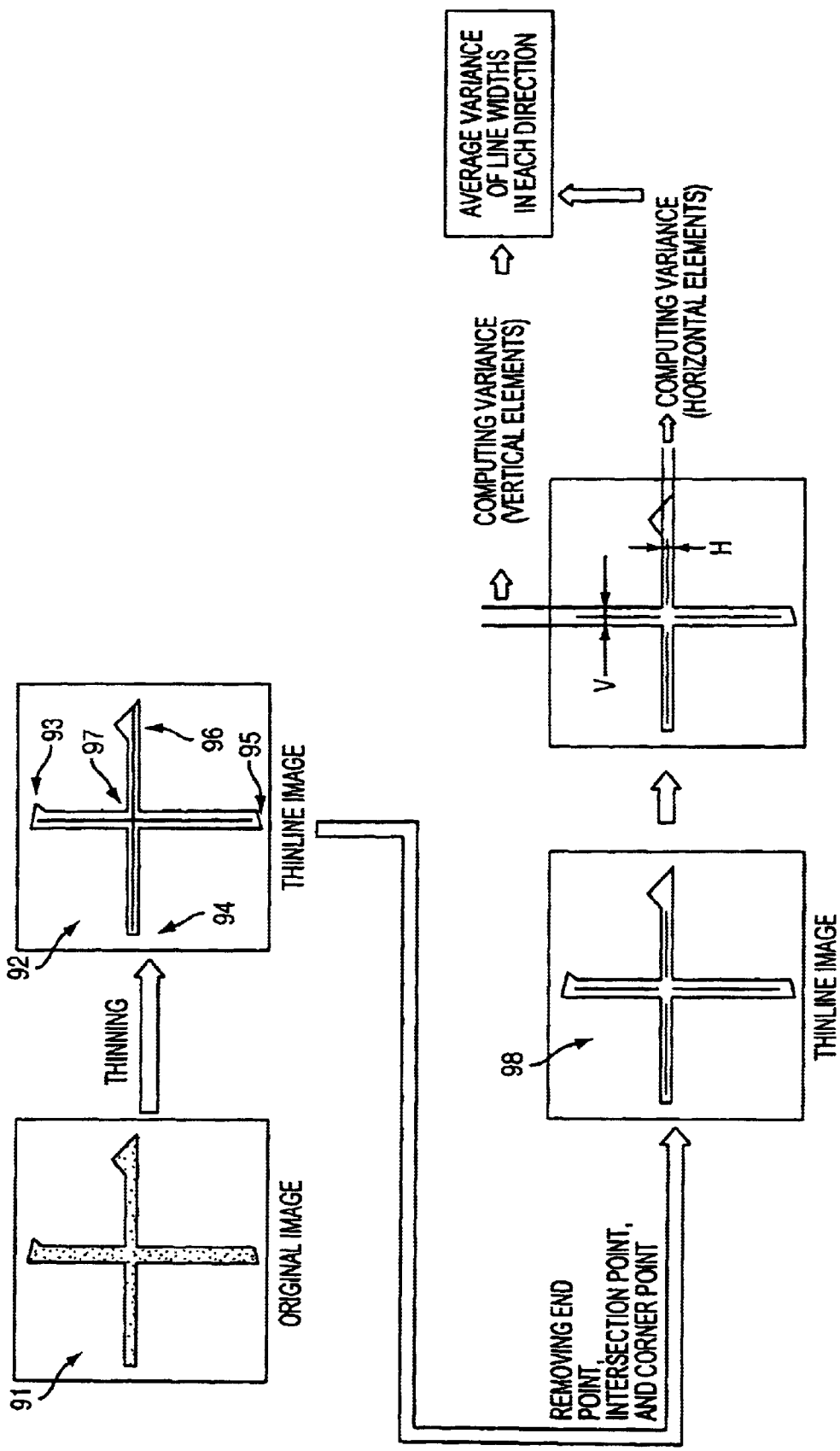
FIG. 15 shows the concept of the line width variance extracting process.

FIG. 14 is a flowchart of the line width variance extracting process according to an embodiment of the present invention. FIG. 15 shows the concept of the line width variance extracting process.

To extract the variance of line widths from character image data, the line of a character image is first thinned to obtain a thin line image (step S31). For example, in the example shown in FIG. 15, a thin line image 92 can be obtained by thinning the line of an original image 91.

Then, end points 93 through 96, an intersecting point 97, and a corner point are obtained from the thin line image 92. A thin line image 98 is obtained by removing the picture elements around the end points 93 through 96, the intersecting point 97, and the corner point from the thin line image 92 (steps S32 and S33).

Then, a vector is obtained for each point remaining in the thin line image obtained in step S33, and the line width in the direction vertical to the vector is obtained (step S34). In the example shown in FIG. 15, the line widths H and V respectively in the horizontal and vertical directions are obtained for each point remaining in the thin line image 98.

The variance of line widths H and V (standard deviation) is obtained for each direction of a vector, and an average value is stored (step S35).

As described above, according to the obtained feature parameter, a hand-written character or a typed character is discriminated, thereby identifying a hand-written character and a typed character with high precision. In addition, in Mincho characters, a hand-written character can be discriminated from a typed character with higher precision by obtaining the variance of line widths with an end point, an intersecting point, and a corner point of a stroke removed from the stroke, and by obtaining the variance of line widths for each vector direction as described above.

(4) Extracting Variance of Character Positions

Figures 16A, 16B, 16C:
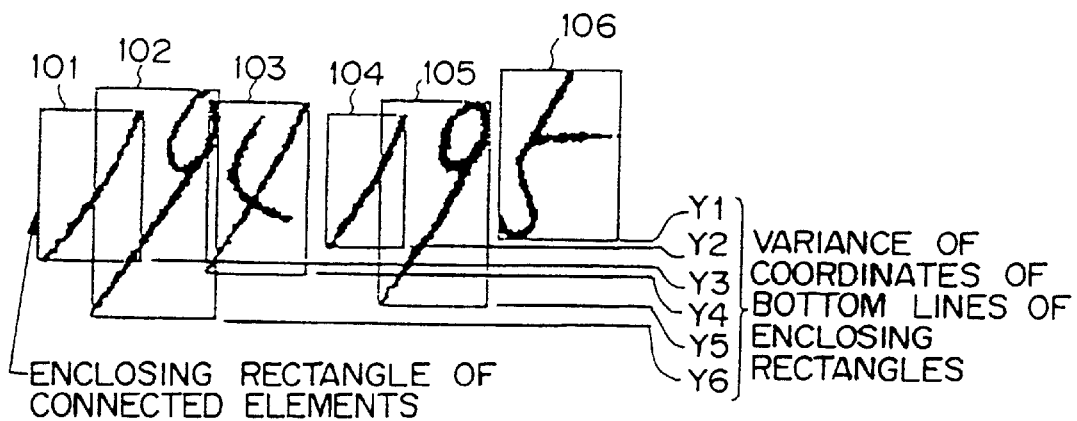
FIG. 16 shows the variance of the positions of the coordinates of the bottom lines of hand-written characters and typed characters, and the variance extracting process.

The variance of the positions of the coordinates of the bottom line of each character is small for a typed character as shown in FIG. 16A, and the variance is large for a hand-written character as shown in FIG. 16B. Therefore, the variance is an effective parameter for use in identifying a hand-written character and a typed character. Especially, this method is effective for an area, for example, a column of an amount in a listing where numeric characters are to be entered.

Figure 17:
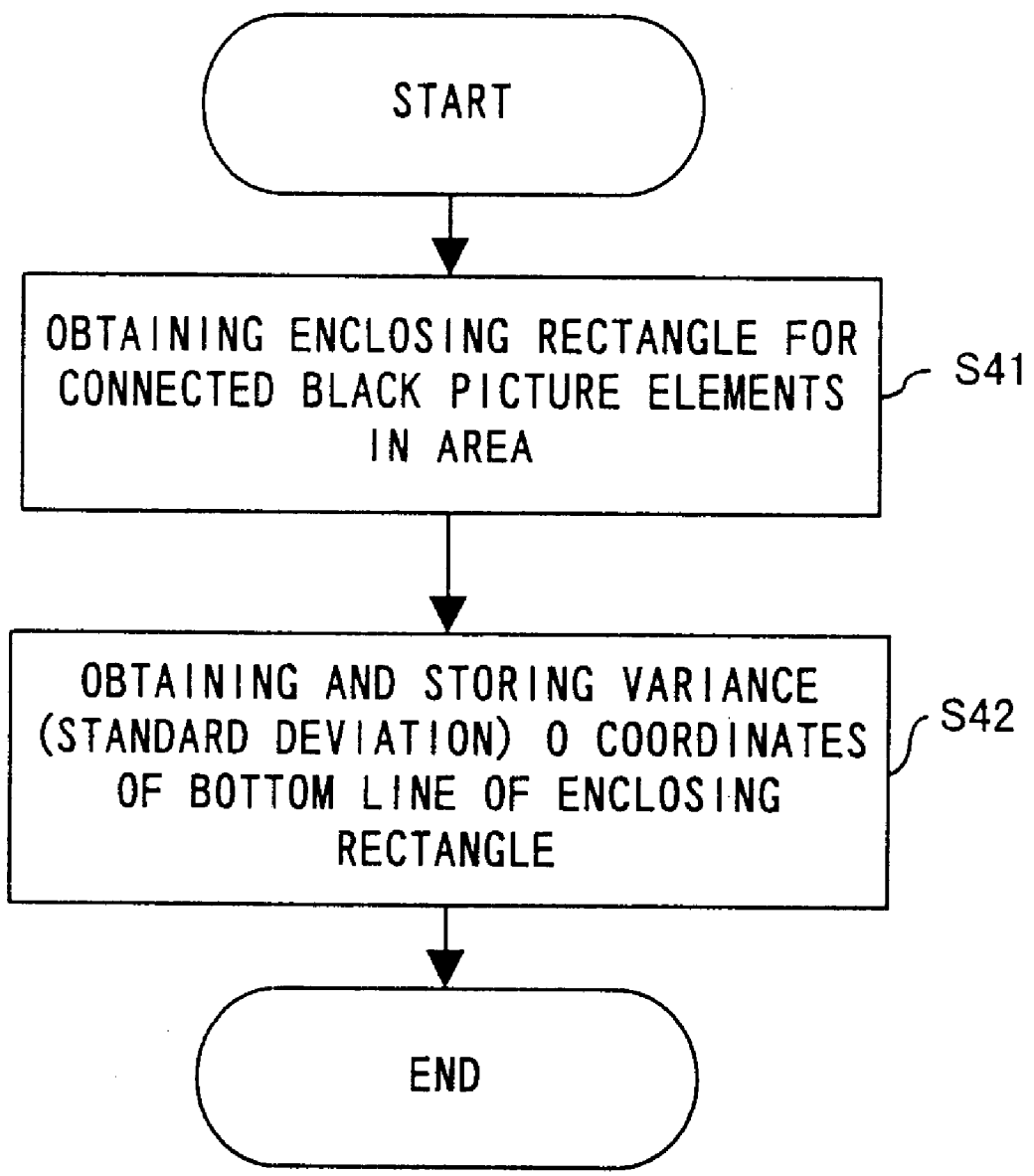
FIG. 17 is a flowchart of the variance extracting process of character positions.

FIG. 17 is a flowchart of the process of extracting the variance of character positions according to an embodiment of the present invention.

To extract the variance of line widths from character image data, an enclosing rectangle for connected black picture elements in an area is obtained (step S41). For example, for the connected elements shown in FIG. 16B, enclosing rectangles 101 through 106 are obtained as shown in FIG. 16C.

Then, the variance (standard deviation) of the coordinates Y1 through Y6 of the bottom line of the enclosing rectangles 101 through 106 are obtained and stored (step S42).

By performing the above described process, the feature parameter relating to the variance of character positions can be obtained. Using the feature parameter, a hand-written character and a typed character can be identified with high precision in an area, for example, a column of an amount, etc. where numeric characters are to be entered.

According to the above described embodiment, the following effect can be obtained.

(1) Since a hand-written character and a typed character are identified using a feature vector containing a feature amount indicating at least the complexity and the linearity of a character pattern, the identifying process can be performed within a short time with high precision.

(2) The feature indicating the complexity can be easily obtained at a high speed by using the line density as the feature indicating the complexity.

(3) A hand-written character can be more precisely discriminated from a typed character without the influence of ornaments to the font such as Mincho characters by identifying a hand-written character and a typed character using as a feature amount the variance of line widths obtained by removing the pattern within a predetermined distance from the end point, the intersecting point, and the corner point of a character stroke contained in a character pattern.

(4) By obtaining the variance of line widths for each stroke or for each stroke direction, the variance of line widths can be extracted without the influence of the difference in line width depending on the direction of a stroke in Mincho characters, thereby more precisely identifying a hand-written character and a typed character.

What is claimed is:

1. A method of recognizing a character, comprising:

extracting a character string pattern from an image in a document or a listing;

extracting a feature indicating complexity of the character string pattern;

extracting a feature indicating linearity of the character string pattern;

extracting a feature indicating a variance of character positions of the character string pattern;

obtaining N feature vectors containing a feature indicating at least complexity, linearity and a variance of character positions of the character string pattern; and discriminating the character string pattern between a hand-written character and a typed character using the feature vectors, and performing a character recognizing process based on a discrimination result, wherein line density is used as a feature indicating the complexity.

2. A method of recognizing a character, comprising:

extracting a character string pattern from an image in a document or a listing;

extracting a feature amount indicating a variance of line widths obtained by removing from the character string pattern a pattern within a predetermined distance from an end point, an intersecting point, and a corner point of a character stroke contained in the character string pattern, and a feature amount indicating a variance of character positions of the character string pattern;

discriminating a hand-written character from a typed character based on at least the feature amount; and recognizing a character based on a discrimination result, wherein the variance of line widths is obtained for each stroke or a stroke direction.

3. A character recognition apparatus comprising:

a character extraction unit extracting a character string pattern from an image in a document or a listing;

a hand-written/typed character discrimination unit discriminating the character string pattern between a hand-written character and a typed character; and a character recognition unit recognizing a character based on a discrimination result, wherein said hand-written/typed character discrimination unit comprises:

a complexity extraction unit extracting a feature indicating complexity of the character string pattern from the character string pattern;

a linearity extraction unit extracting a feature indicating linearity of the character string pattern;

a character position variance unit extracting a feature indicating a variance of character positions of the character string pattern;

a discrimination unit discriminating the character string pattern between a hand-written character and a typed character based on N feature vectors containing at least a feature indicating the complexity, a feature indicating the linearity and a variance of character positions of the character string pattern, wherein said complexity extraction unit extracts a feature indicating the complexity by obtaining line density from the character string pattern.

4. A character recognition apparatus comprising:

a character extraction unit extracting a character pattern from an image in a document or a listing;

a hand-written/typed character discrimination unit discriminating the character string pattern between a hand-written character and a typed character; and a character recognition unit recognizing a character based on a discrimination result, wherein said hand-written/typed character discrimination unit comprises:

a line width variance extraction unit extracting a feature amount indicating a variance of line widths obtained by removing from the character string pattern a pattern within a predetermined distance from an end point, an intersecting point, and a corner point of a character stroke contained in the character string pattern;

a character position variance unit extracting a feature indicating a variance of character positions of the character string pattern;

a discrimination unit discriminating the character string pattern between a hand-written character and a typed character based on at least a feature amount indicating the variance of line widths and a variance of character positions of the character string pattern, wherein said line width variance extraction unit obtains the variance of line widths for each stroke or stroke direction.

5. A character recognition apparatus, comprising:

a feature identification unit identifying a feature of a characterizing pattern extracted from an input image;

a hand-written character recognition unit character-recognizing a hand-written character;

a typed character recognition unit character-recognizing a typed character; and a character recognition selection unit selecting one of said hand-written character recognition unit and said typed character recognition unit based on an identification result from said feature identification unit, wherein:

said feature identification unit discriminates the pattern between a hand-written character and a typed character based on regularity of a pattern;

a feature of the pattern contains at least one of complexity, linearity, variance of line widths, variance of arrangement positions, variance of tilts, variance of sizes, variance of character positions of the pattern;

said complexity contains at least one of line density, density of black picture elements, an Euler number, and an outline length; and said linearity is computed based on a number of lines longer than a predetermined length in the pattern.

6. A computer-readable storage medium storing a character recognizing program for recognizing a character string pattern extracted from an image in a document or a listing, wherein said character recognizing program directs a computer to perform operations of:

extracting a feature indicating complexity of the character string pattern;

extracting a feature indicating linearity of the character string pattern;

extracting a feature indicating a variance of character positions of the character string pattern;

obtaining, from the character string pattern, N feature vectors containing a feature indicating at least complexity, linearity and a variance of character positions of the character string pattern; and discriminating the character string pattern between a hand-written character and a typed character using the feature vectors, wherein line density is used as a feature indicating the complexity.

7. A computer-readable storage medium storing a character recognizing program for recognizing a character string pattern extracted from an image in a document or a listing, wherein said character recognizing program directs a computer to perform operations of:

extracting a feature amount indicating a variance of line widths obtained by removing from the character string pattern a pattern within a predetermined distance from an end point, an intersecting point, and a corner point of a character stroke contained in the character string pattern, and a feature amount indicating a variance of character positions of the character string pattern; and discriminating a hand-written character from a typed character based on at least the feature amount, wherein said variance of line widths is obtained for each stroke or a stroke direction.

8. A character recognition method, comprising:

extracting a character string pattern from an image;

identifying a feature of the character string pattern extracted from the image; and determining whether a character is a handwritten character or a typed character based on at least the identified feature, wherein said identifying comprises:

extracting a feature amount indicating a variance of line widths obtained by removing from the character string pattern a pattern within a predetermined distance from an end point, an intersecting point and a corner point of a character stroke contained in the character string pattern;

extracting a feature indicating complexity of the character string pattern;

extracting a feature indicating linearity of the character string pattern;

extracting a feature indicating a variance of character positions of the character string pattern;

obtaining feature vectors containing a feature indicating at least complexity, linearity and a variance of character positions of the character string pattern, and wherein said determining is performed by using the feature vectors.

* * * * *